United States Patent
Dziewinski et al.

Patent Number: 6,030,520
Date of Patent: *Feb. 29, 2000

[54] NITRATE REDUCTION

[75] Inventors: Jacek J. Dziewinski; Stanislaw Marczak, both of Los Alamos, N.Mex.

[73] Assignee: The Regents of the University of California, Los Alamos, N.Mex.

[*] Notice: This patent issued on a continued prosecution application filed under 37 CFR 1.53(d), and is subject to the twenty year patent term provisions of 35 U.S.C. 154(a)(2).

[21] Appl. No.: 08/857,232

[22] Filed: May 16, 1997

Related U.S. Application Data

[60] Provisional application No. 60/044,099, Apr. 23, 1997.

[51] Int. Cl.$^7$ .................................................... C02F 1/461
[52] U.S. Cl. ......................... 205/771; 205/772; 210/757; 210/749
[58] Field of Search .................................. 205/771, 772; 210/757, 749

[56] References Cited

U.S. PATENT DOCUMENTS

| | | | |
|---|---|---|---|
| H1126 | 1/1993 | Pan et al. | 210/718 |
| 4,212,735 | 7/1980 | Miller | 210/63 |
| 4,276,198 | 6/1981 | Miller | 252/438 |
| 4,415,456 | 11/1983 | Chandler, Jr. | 210/673 |
| 4,452,702 | 6/1984 | Blasius et al. | 210/638 |
| 4,497,782 | 2/1985 | Howell et al. | 423/184 |
| 4,990,226 | 2/1991 | Vorlop et al. | 210/748 |
| 4,990,266 | 2/1991 | Vorlop et al. | |
| 5,073,273 | 12/1991 | Gupta et al. | 210/760 |
| 5,118,447 | 6/1992 | Cox et al. | 252/626 |
| 5,306,400 | 4/1994 | Bradbury et al. | 204/101 |
| 5,370,528 | 12/1994 | Mattus | 431/258 |
| 5,376,240 | 12/1996 | Kaczur et al. | 205/639 |
| 5,391,268 | 2/1995 | Kaczur et al. | 204/102 |

FOREIGN PATENT DOCUMENTS 53-067678  6/1978  Japan .

OTHER PUBLICATIONS

Nydahl, "On the Optimum Conditions for the Reduction of Nitrate to Nitrite by Cadmium." 1976. Abstract only No Month.

*Primary Examiner*—Arun S. Phasge
*Attorney, Agent, or Firm*—Samuel M. Freund

[57] ABSTRACT

Nitrates are reduced to nitrogen gas by contacting the nitrates with a metal to reduce the nitrates to nitrites which are then contacted with an amide to produce nitrogen and carbon dioxide or acid anions which can be released to the atmosphere. Minor amounts of metal catalysts can be useful in the reduction of the nitrates to nitrites. Metal salts which are formed can be treated electrochemically to recover the metals.

6 Claims, 3 Drawing Sheets

NITRATE REDUCTION

This application claims the benefit of U.S. provisional Application No. 60/044,099, filed Apr. 23, 1997.

This invention was made with government support under Contract No. W-7405-ENG-36 awarded by the U.S. Department of Energy. The government has certain rights in the invention.

TECHNICAL FIELD

This invention relates to reduction of nitrates, particularly nitrates in waste streams.

BACKGROUND ART

Nitrate wastes represent an environmental problem. Nitrate-based solvents are used in weapons research and production. Mining, chemical, farming and other industries are also major generators of nitrate wastes. Such wastes contaminate natural waters if released into the environment. The strong oxidizing power of nitrates causes excessive biological activity, growth of the vegetation, and precipitation of organic residue to the bottoms of streams, rivers, lakes, and oceans. As a result of precipitation of organic residue from nitrate waste streams, water reservoirs become shallow and eventually are converted to marshes and decay.

There have been developed several methods of treating nitrates in industrial and agricultural waste streams to convert the nitrates to less environmentally hazardous substances, but no simple, economical process for destruction or separation of nitrates from aqueous solutions is known. Generally nitrate wastes are treated by concentration in reverse osmosis, electrodialysis, evaporation, and ion exchange processes. Although the nitrates are at much reduced volume and increased concentration, the products of these processes are still nitrate wastes.

Evaporation is used to convert the nitrates into solid nitrate salts which can be thermally destroyed. Usually thermal treatments result in undesirable nitrogen oxides. Both evaporation and thermal destruction are very energy intensive processes.

Although nitrates can be reduced to nitrogen gas and ammonia by biological destruction, this process is slow, difficult to control and results in an organic residue.

Nitrates have been treated with supercritical water or wet air oxidation methods. However, these methods require extreme temperatures and pressures. The equipment is not easy to operate particularly when dealing with waste streams having inconsistent contents or concentrations. Products of nitrate reduction with supercritical fluids may contain undesirable $NO_x$ components.

There is still a need for easily controlled methods of converting nitrate wastes at moderate temperatures and pressures to more environmentally benign substances.

Therefore, it is an object of this invention to provide a method of treating nitrate waste streams to obtain more environmentally benign substances.

It is another object of this invention to provide a method of reduction of nitrates to nitrogen gas.

It is a further object of this invention to provide a method of reduction of nitrates to carbon dioxide and nitrogen gas in which any metals used are recovered and recycled.

It is yet another object of this invention to provide a simple continuous process by which waste streams containing nitrates can be treated to reduce the nitrates to environmentally benign substances.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method of reducing nitrates comprising:

(a) contacting at least one nitrate with at least one metal to produce a nitrite;

(b) contacting the nitrite with at least one amide to produce nitrogen and carbon dioxide or acid anions.

Steps (a) and (b) can be reiterated as many times as needed for virtually complete processing of the nitrates into nitrogen and carbon dioxide or acid anions. The reiteration of the steps can be carried out sequentially as separate steps, or simultaneously in a single processing batch, or sequentially in a continuous process.

The nitrates in an aqueous solution or slurry are contacted with the primary metal reactant. Addition of minor amounts of other metals such as copper, silver or mercury as catalysts can be advantageous. The metal salts which are formed in the reduction reaction can be treated electrochemically to recover the metals.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

BEST MODES FOR CARRYING OUT THE INVENTION

Figure 1:
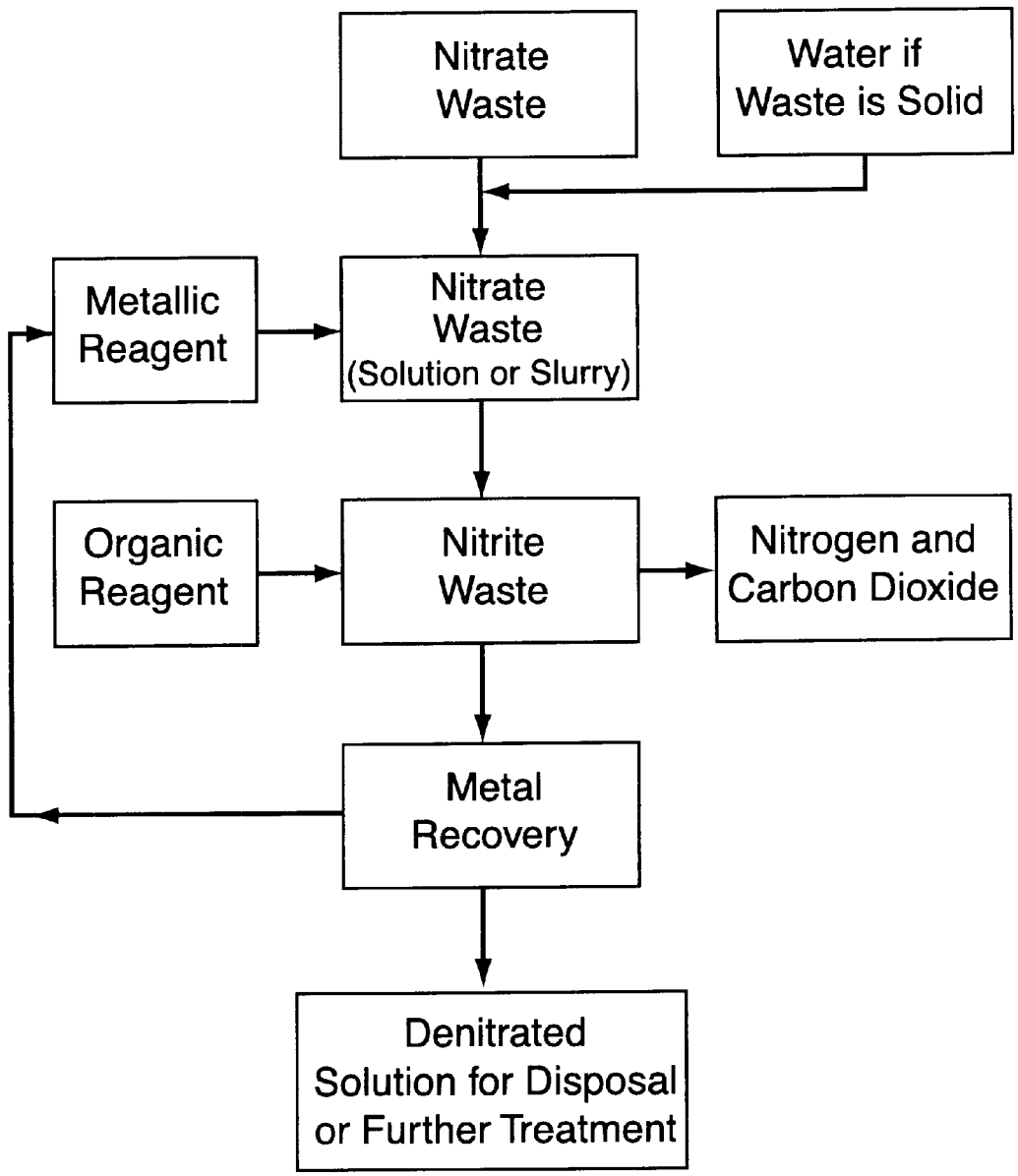
FIG. 1 is a schematic of a presently preferred embodiment of the invention method.

It has been discovered that nitrates, including both those occurring in industrial, mining or agricultural waste streams and those in solid nitrate-containing materials, can be reduced to more environmentally benign substances by reacting the nitrates with certain metals in an aqueous solution, then reacting the resulting solution with an amide. A catalyst can be used. The metal salts which form in the reaction can be recovered using an electrochemical process.

The method of this invention can be used for denitrification of waste streams having a great variety of components and for treatment of waste streams having a wide range of concentrations of nitrates. For example, the method of this invention can be used for treatment of radioactive waste water effluents which are high in nitrate concentration or for remediation of contaminated natural waters with low levels of nitrates.

Waste streams with virtually any nitrate concentration can be treated using the invention method. Concentrations ranging from upper solubility limits for given salts (typically in the range between 100 g/L and 1,000 g/L) to lower limits of only a few parts per billion can be successfully treated using the invention method.

Aqueous waste streams containing nitrates are first contacted with a metal such as cadmium or zinc. This contact may be made in the presence of a metal catalyst such as copper, silver and mercury to enhance reactivity.

Solid nitrate salts or heterogeneous solids containing nitrate salts can be processed by mixing them with water by any suitable means and subjecting the resulting aqueous solution or slurry to the same steps.

Metals which are useful reagents for contacting the aqueous nitrate waste streams in the practice of this invention include, but are not limited to, cadmium, zinc, lead, iron, silver, copper, mercury, tin, nickel, manganese, magnesium, and alloys or mixtures thereof.

An amount of metal sufficient to complete the reduction of the nitrates to nitrites ($NO_3^-$ to $NO_2^-$) is needed. An amount in the range from about 30 to about 4,000 weight percent, based upon weight of $NO_3^-$ is generally useful in the invention. More preferable is an amount of metal in the range from about 60 to about 1,000 weight percent, based on weight of $NO_3^-$. Generally presently preferred is an amount of metal in the range from about 100 to about 600 weight percent, based on weight of $NO_3^-$. Use of too little metal will result in incomplete reduction of the nitrates to nitrites. Use of too much metal will cause excessive reduction of $NO_3^-$ to $N_2O$, $NH_2OH$ or $NH_3$.

A second metal may be needed to catalyze the reduction reaction between the nitrates in the aqueous waste stream and the metal. Metal catalysts which are useful in the practice of the invention are those which are more nobel than the primary metal reagent used to contact the nitrate solution or slurry. These catalyst metals include, but are not limited to, copper, silver, mercury, palladium, platinum and alloys or mixtures thereof. A wide range of forms and sizes of catalyst metal can be used, including solid plates or other forms, particles or powders.

An amount of catalyst metal sufficient to effect a positive change in reactivity is needed. An amount of catalyst metal in the range from greater than 0 to about 5 weight percent based upon weight of the primary metal used is generally useful in the invention. More preferable is an amount of catalyst metal in the range from about 0.001 to about 1 weight percent, based upon weight of the primary metal. Generally presently preferred is an amount of catalyst metal in the range from about 0.005 to about 0.5 weight percent, based upon weight of the primary metal. Use of too little catalyst metal may result in incomplete reduction of the nitrates to nitrites. Use of more than an effective amount of catalyst metal would be uneconomical.

The catalyst metal can be incorporated in the invention method using most any convenient means. For example, the catalyst metal can be applied to the surface of the primary reduction metal by contacting the primary reduction metal with a solution containing ions of the catalyst metal. Alternatively, a salt containing ions of the catalyst metal can be added to the waste stream to be treated, or can be added to the primary metal before contacting the nitrate solution or slurry with the primary metal.

Sufficient mixing (or fluid bed, trickle bed or fixed bed processing) to achieve effective contact of the catalyst metal with the primary reduction metal is used. For example, in batch processes, a metallic powder which has been coated with catalyst metal may be mixed with the nitrate solution in a stirred reactor tank.

Alternatively, the nitrate solution may be passed through a bed of dispersed metal. In another method, the nitrate solution may be contacted with a solid non-dispensed metal structure, such as metal sheets, spheres or cylinders.

Other additives may be used as necessary to deal with other components of the waste stream or to enhance the activity of the metal.

The nitrates are quantitatively reduced to nitrites. Both the nitrites and the metal cations are released into the solution or slurry that contained the nitrates. The resulting aqueous nitrite solution is then contacted with an amide reagent to reduce the nitrites to nitrogen and carbon dioxide or acid anions.

The reduction of the nitrites to nitrogen may be carried out simultaneously with further nitrate reduction to nitrites or in a sequence following the nitrate reduction. It may be done in the same vessel as the nitrate reduction or the solution may be pumped to another vessel.

Amides which are useful in the practice of the invention are those which produce environmentally benign products during hydrolysis. Choice of amide will depend upon which end products are desired. For example, use of urea for the amide will result in nitrogen and carbon dioxide end products. Generally amides presently preferred include, but are not limited to, urea, sulfamic acid, formamide, acetamide and mixtures thereof. Amides such as urea or sulfamic acid are the presently most preferred amide reagents for reduction of the nitrites to nitrogen and carbon dioxide or acid anions.

An amount of amide sufficient to complete the nitrite to nitrogen conversion is needed. An amount of amide in the range from about 10 to about 1,050 weight percent based upon weight of the nitrites is generally useful in the invention. More preferable is an amount of amide in the range from about 30 to about 420 weight percent, based upon weight of the nitrites. Generally presently preferred is an amount of amide in the range from about 65 to about 210 weight percent, based upon weight of the nitrites. Use of too little amide will result in incomplete conversion of the nitrites to nitrogen. Use of too much amide will cause excessive production of ammonia in the reaction solution.

The pH of both the nitrate to nitrite reaction and the nitrite to nitrogen reaction is adjusted as necessary to obtain a weakly acidic reaction environment. Generally, depending upon the concentration of nitrate at the start of the process, the pH can range from about 0 to about 8, getting less acidic as the reaction goes forward. A pH of about 1 to 6 is presently preferred when cadmium is used as the reactant metal, copper is used as the catalyst metal and urea is used as the amide.

The nitrites from the aqueous solution or slurry oxidize the amide. Nitrogen, carbon dioxide or acid anions are released from the reaction. The nitrogen which is produced by the invention method can be either released to the atmosphere or captured.

The cadmium, zinc or other metal remains in the aqueous solution as a salt, the metal cations of which can be electrochemically reduced to metals. When the aqueous solution or slurry is subjected to a direct current between an anode and cathode submersed therein, the metal will plate out on the cathode and can be recovered therefrom.

The electrochemical treatment of the aqueous solution can be done in the same vessel as the nitrogen release reaction or can be done in a separate vessel to which the aqueous solution has been pumped. When solid non-dispensed metal structures such as metal sheets, spheres or cylinders are used, they may be connected to a current source to serve as electrodes. Thus, metal recovery by electroplating may be carried out in the same vessel as the nitrate reduction.

The metal recovery may be carried out simultaneously with the nitrite to nitrogen reduction reaction, or simultaneously with the nitrate to nitrite reduction reaction after a reduction step is completed, or the metal recovery may be performed sequentially as a final step of the process.

The recovered metal can be reused in the same on-going process or collected and transported to other uses. Preferably the metal would be reused in the same process.

The invention process can be carried out in two or three sequential steps or in a one step batch process or in a continuous one step process.

After the steps in a batch process are completed, the products of the process are released to the environment or to further treatment for other components if such treatment is desired. The vessel is again filled with more aqueous solution or slurry containing the next batch of nitrates to be treated.

FIG. 1 is a schematic of a presently preferred embodiment of the invention. As shown in FIG. 1, in a continuous process the nitrate solution or slurry is continually pumped through a reactor vessel where it is treated with the metallic reagent. The reactor may be a tank reactor with agitation, or a plug flow type reactor with a bed of metal. The metal may be in powdered, dispersed, or solid form.

In a continuous process the metal recovery may be performed simultaneously with the nitrate to nitrite reduction reaction step, or the metal recovery can be performed as a subsequent step, as shown in FIG. 1.

Still with reference to FIG. 1, after the reduction of nitrate to nitrite by addition of the metallic reagents, the nitrite solution may continually flow to another (second) reactor where the organic reagent is continually added. The nitrites will be reduced to carbon dioxide and nitrogen gas in the second reactor and released from the reactor.

Alternatively the same reactor used for the nitrate to nitrite reduction step can be used for the nitrite to nitrogen reduction step. In such a scenario the metallic reagent will be contacted with the influent nitrate waste slurry simultaneously with the addition of the organic reagent and the nitrate to nitrite reduction will be carried out simultaneously with the nitrite to nitrogen reaction.

The metallic reagent recovery step may be performed continually in a separate reactor vessel or in the same reactor vessel. The schematic of FIG. 1 shows the slurry liquid and reacted metals going from the second reactor vessel into a third vessel (electrochemical cell) where metal recovery will be accomplished.

The reduced solution containing cations of the metallic reagent may continuously flow to the electrochemical cell. In such a cell the metal will be recovered from the solution by electrochemical reduction on cathodes. As shown in the schematic of FIG. 1, the recovered metals can then be recirculated into the first reactor vessel to react with more of the incoming nitrate waste slurry.

The denitrated solution may be released from this cell to the environment or may be directed to further processing if desired.

Alternatively, the electrodes may be in contact with the solution in the same reactor as that used for the nitrate to nitrite reaction or the nitrite to nitrogen reaction and metal recovery performed there.

The invention process can be carried out at ambient temperatures and pressures and is generally easy to control.

The invention process is fast and does not produce solid sediments. Reduction of nitrates in highly concentrated waste streams to concentration levels in the parts per billion range can be accomplished by employment of the invention process.

The following examples will demonstrate the operability of the invention.

EXAMPLE I

A reaction was run to demonstrate reduction of nitrates to nitrites in aqueous solution in accordance with the first step of the invention.

A copperized cadmium column was prepared by placing 92.30 g of cadmium powder into a glass column which was 20 cm high and had a 1.4 cm inner diameter. The cadmium bed rested on a sintered glass disk located at the bottom of the column. The cadmium bed was rinsed twice with 10% HCl. Next 25 ml of 0.34 M $CuSO_4$ solution was passed three times through the bed at a 10 ml/min flow rate. After the third pass the effluent solution was colorless and cadmium particles were covered with metallic copper.

A 100 ml portion of aqueous solution of potassium nitrate was prepared using tap water and potassium nitrate salt. The nitrate concentration was about 0.1 moles/L. The pH of this solution was adjusted to 1.7 using concentrated HCl.

The aqueous potassium nitrate solution was pumped several times through the copperized cadmium column at a 7.9 ml/min flow rate. After each run a 1 ml sample was taken, and the pH of the solution was adjusted to 1.7 with 4.05 M HCl. The solution was run through the column 10 times.

The process was performed at room temperature and ambient atmospheric pressure.

Figure 2A:
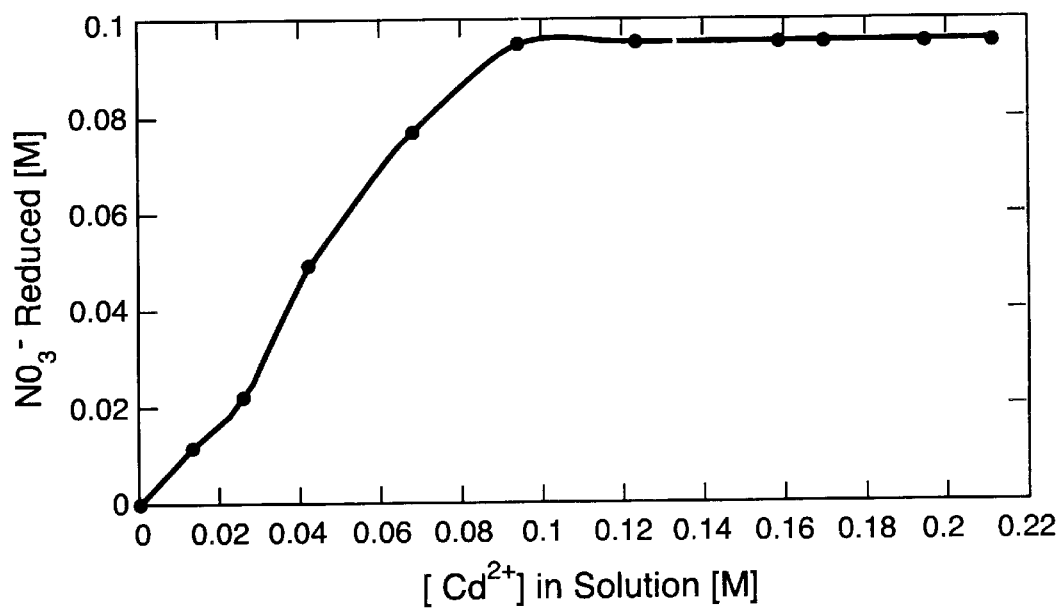
FIGS. 2a and 2b are graphs of results of runs in which nitrates were converted to nitrites in accordance with the first step of the invention.
Figure 2B:
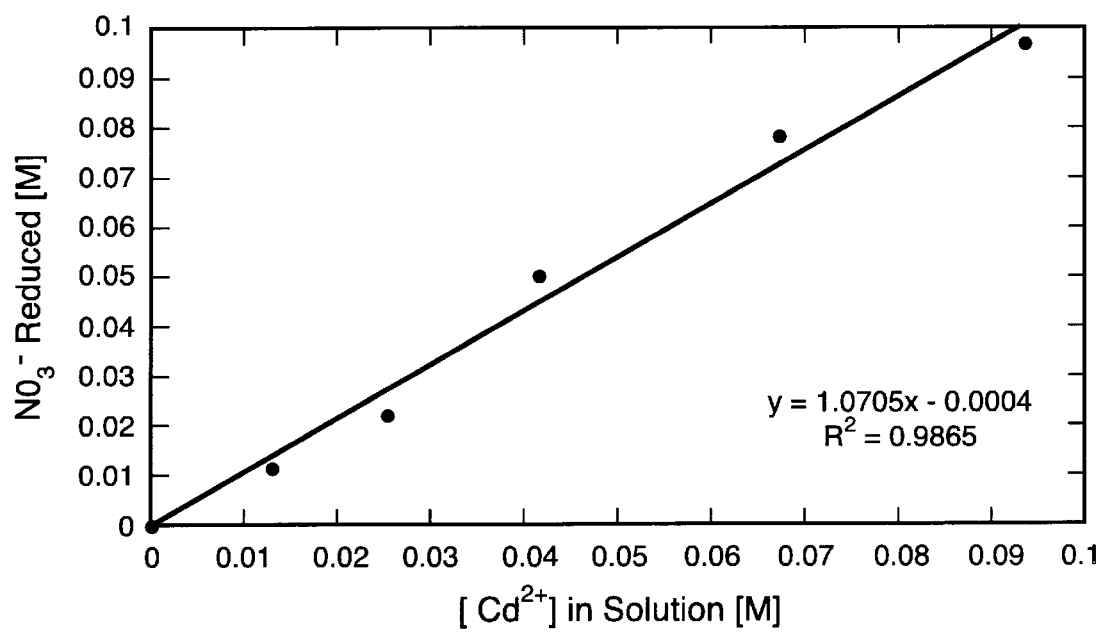

The collected samples were tested to determine $NO_3^-$ and $NO_2^-$ concentrations by direct UV spectroscopy ($NO_3^-$ at 302 nm and $NO_2^-$ at 354 nm). Cd concentration was tested by ICP-AES (at 228.802, 214.440 and 226.500 nm). Results are presented in FIG. 2a and 2b. FIG. 2a is a graph of the molar amounts of $NO_3$- plotted as a finction of the molar amounts of $Cd^{2+}$ in the reaction solution. FIG. 2b is an expanded graph of the portion of the graph of FIG. 2a having data points for amounts of $Cd^{2+}$ from 0 to 0.1 moles.

The results presented in FIGS. 2a and 2b show that each cadmium ion introduced to the solution resulted in reducing 1.07(+/−0.06) $NO_3$- ions. The sum of $NO_3$- and $NO_2$- molar concentrations remained constant meaning that the nitrate reduction stopped at nitrite.

EXAMPLE II

A second set of runs was made to demonstrate the reduction of nitrates to nitrites in aqueous solution in accordance with the first step of the invention.

In each of seven 100 ml volumetric flasks 10.0 ml of 1.00 M $KNO_3$ and 5.0 ml of 1.055 M $H_2SO_4$ were placed. Quantities of various amounts of $CuSO_4$ solution were added to each of the flasks and the flasks were then filled with de-ionized water. The amounts of $CuSO_4$ solution added to each of the flasks were as indicated in Table I. The initial compositions of these samples are given in Table I.

The solution from each of the volumetric flasks was transferred to 250 ml Erlenmeyer flasks containing 1.36 g of cadmium granules, 0.2–1 mm in diameter and 3–5 mm long. The flasks were capped, placed on a rotary shaker set at 400 rpm, and allowed to react for 2 hours at ambient temperatures and pressures.

TABLE 1

Amounts of Components in Each of Seven Invention Runs and Reduction Efficiency Achieved

| Sample | $NO_3^-$ mmoles | M/L | $H^+$ mmoles | M/L | Cd mmoles | $Cu^{2+}$ mmoles | M/L | reduction efficiency % |
|---|---|---|---|---|---|---|---|---|
| 1 | 10.0 | 0.10 | 10.55 | 0.1055 | 12.0 | 0 | 0 | 96.3 |
| 2 | 10.0 | 0.10 | 10.55 | 0.1055 | 12.0 | 0.000012 | 1.2e–7 | 97.4 |
| 3 | 10.0 | 0.01 | 10.55 | 0.1055 | 12.0 | 0.00012 | 1.2e–6 | 92.5 |
| 4 | 10.0 | 0.10 | 10.55 | 0.1055 | 12.0 | 0.0012 | 1.2e–5 | 93.5 |
| 5 | 10.0 | 0.10 | 10.55 | 0.1055 | 12.0 | 0.012 | 1.2e–4 | 88.2 |
| 6 | 10.0 | 0.10 | 10.55 | 0.1055 | 12.0 | 0.12 | 1.2e–3 | 88.9 |
| 7 | 10.0 | 0.10 | 10.55 | 0.1055 | 12.0 | 1.2 | 1.2e–2 | 93.6 |

Cadmium reacts with nitrate according to:

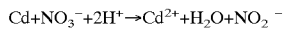

$$Cd + NO_3^- + 2H^+ \rightarrow Cd^{2+} + H_2O + NO_2^-$$

As shown in the table above, there was a 20% excess of cadmium but hydronium cations were in deficiency. There was only enough $H^+$ to reduce only 52.75% of the nitrates.

The post-reaction solutions were analyzed by UV spectroscopy. The sum of $[NO_3^-]+[NO_2^-]$ remained constant, indicating no $NO_2^-$ reduction. With decreasing amounts of $CuSO_4$ catalyst, reduction of nitrate increased from 46.5% (reduction efficiency 88.9%) to 51.5% (reduction efficiency 97.4%). 50.8% (reduction efficiency 96.3%) of reduction was achieved when no copper was present.

EXAMPLE III

Operability of the second step of the invention process, i.e. the treatment of nitrites with an organic agent, was demonstrated in the 13 test runs of this example. The organic agent used was urea in the form of 1.0 M solution in de-ionized water.

In each of the runs, initial concentration of nitrite was equal to 0.05 M. In each of the runs, urea concentration was changed from 0 to 0.05 M in 0.005 M increments and from concentrations of 0.05 to 0.07 M in 0.01 M increments. Initial acid (HCl) concentrations were kept constant and equal to 0.5 M.

All runs were prepared in the following manner. In each of 13 25 ml volumetric flasks a 1.25 ml portion of 1.0 M $NaNO_2$ and the selected quantity of 1.0 M urea solution were placed. Next, water was added followed by addition of 12.5 ml of 1.0 M HCl. Finally each flask was filled up to the 25 ml line with water, turned over 5 times and left open for one hour at room temperature to complete the reaction. The nitrite concentration was measured (by UV spectroscopy) of the post-reaction solutions.

For each sample with urea concentration 0.03 M or higher, a complete nitrite removal was achieved. Nitrite reacted with urea in a 1.78:1 ratio. That reaction ratio indicates that for each 1 mole of nitrite removed, 1 mole of $N_2$, 0.56 moles of $CO_2$, and 0.12 moles of $NH_{4+}$ was produced.

EXAMPLE IV

An additional set of 13 runs was made to further demonstrate operability of the second step of the invention procedure. This procedure from Example III was followed, with the exception that hydrochloric acid concentration was kept at 0.2 M. To maintain this HCl concentration, only 5.0 ml of 1.0 M HCl was added to each run.

For each sample with urea concentration 0.03 M or higher, a complete nitrite removal was achieved. Nitrite reacted with urea in 2.01: 1 ratio. That reaction ratio indicates that for each 1 mole of nitrite removed, 1 mole of $N_2$ and 0.50 moles of $CO_2$ were produced.

The desired stoichiometric nitrite to urea ratio is 2:1. At 2:1 stoichiometry no ammonia is produced and nitrates and urea are converted quantitatively into nitrogen and carbon dioxide.

EXAMPLE V

For this example, several electrolytic tests were performed to demonstrate operability the third step of the invention.

Solutions were prepared by dissolving either $CdSO_4$, $Cd(NO_3)_2$ or $CdCl_2$ in the de-ionized water. The initial pH was adjusted to about pH=2 with the appropriate mineral acid.

The electroreductive stripping of cadmium from aqueous solution was carried out in a RETEC™ cell. The 12 L of solution containing 13 g of $Cd^{2+}$ per L was electrolyzed for 5–8 hours. The solution was never heated or cooled except for the ohmic heating.

During the electrolysis, the pH tended to decrease and was held at a pH of 2 by the addition of 5.0 M NaOH. Several combinations of cathode materials (nickel and aluminum sheets) and polarizers (polyacrylamide, bone glue and gelatin) were used. The polarizers were necessary to inhibit the reduction of water to hydrogen gas, thereby increasing the overall current efficiency of the process.

The best results were obtained with aluminum cathodes and 60 mg/l of polyacrylamide. The average current efficiency was 88% at the 13–2 g/L range, and 46% at the 2–0.2 g/L range. The cadmium concentrations in the solutions decreased to 0.05 ppm. The cadmium deposit on the cathode was soft and easily removable from the aluminum surface. Current efficiencies and final $Cd^{2+}$ concentrations were independent of the counter-ion.

Cadmium recovered in these runs was used in Example 1 for nitrate reduction.

While the compositions and processes of this invention have been described in detail for the purpose of illustration, the inventive compositions and processes are not to be construed as limited thereby. This patent is intended to cover all changes and modifications within the spirit and scope thereof.

INDUSTRIAL APPLICABILITY

The invention can be used for processing nitrate streams from nuclear, industrial (e.g., fertilizer manufacturing), mining and farming operations and in environmental restoration projects. The invention can be used for upgrading the capabilities of existing wastewater treatment plants.

What is claimed is:

1. A method for treatment of aqueous nitrate-containing liquids comprising the steps of:
   (a) acidifying the nitrate-containing liquid, thereby forming a nitrate-containing solution wherein the pH is maintained at less than 5;
   (b) contacting the solution thus formed with at least one metal, whereby the nitrate contained therein is converted to nitrite; and
   (c) contacting the resulting nitrite-containing solution with at least one amide, whereby the nitrite is reacted to form nitrogen.

2. The method as recited in claim 1, wherein said steps of acidifying the nitrate-containing liquid, contacting the resulting solution with at least one metal, and contacting the nitrite-containing solution with at least one amide are carried out simultaneously in the same reactor vessel.

3. The method as recited in claim 1, wherein the at least one metal is selected from the group consisting of cadmium, zinc, lead, iron, silver, copper, mercury, tin, nickel, manganese, magnesium, and alloys or mixtures thereof.

4. The method as recited in claim 1, wherein the at least one amide is selected from the group consisting of urea, sulfamic acid, formamide, acetamide, and mixtures thereof.

5. The method as recited in claim 1, wherein metal ions formed by said step of contacting the nitrate-containing solution with at least one metal are electrochemically recovered in metallic form.

6. The method as recited in claim 1, wherein said aqueous nitrate-containing liquids include slurries.

* * * * *